(12) United States Patent
Borst et al.

(10) Patent No.: US 7,801,238 B2
(45) Date of Patent: Sep. 21, 2010

(54) MIMO COMMUNICATION SYSTEM WITH USER SCHEDULING BASED ON REDUCED CHANNEL STATE INFORMATION

(75) Inventors: Simon C. Borst, Convent Station, NJ (US); Philip Alfred Whiting, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 784 days.

(21) Appl. No.: 11/694,443

(22) Filed: Mar. 30, 2007

(65) Prior Publication Data

US 2008/0242309 A1 Oct. 2, 2008

(51) Int. Cl.
*H04B 7/02* (2006.01)
*H04L 27/00* (2006.01)
*H04L 1/02* (2006.01)

(52) U.S. Cl. .................. 375/267; 375/299; 375/347

(58) Field of Classification Search .......... 375/260, 375/267, 295, 299, 347; 370/57, 252, 267, 370/278, 281–282, 329, 334–337, 342–344, 370/347, 319, 442; 455/101, 103, 450, 452.1, 455/452.2, 561, 24, 39, 562.1
See application file for complete search history.

(56) References Cited

U.S. PATENT DOCUMENTS

| | | | |
|---|---|---|---|
| 7,020,110 B2 * | 3/2006 | Walton et al. | 370/334 |
| 7,403,748 B1 * | 7/2008 | Keskitalo et al. | 455/101 |
| 2005/0265290 A1 | 12/2005 | Hochwald et al. | |
| 2005/0277444 A1 | 12/2005 | Rensburg et al. | |
| 2006/0105761 A1 * | 5/2006 | Walton et al. | 455/423 |
| 2006/0177447 A1 * | 8/2006 | Xu | 424/145.1 |
| 2007/0064641 A1 * | 3/2007 | Laroia et al. | 370/320 |
| 2007/0066229 A1 * | 3/2007 | Zhang et al. | 455/67.11 |
| 2007/0171808 A1 * | 7/2007 | Wu et al. | 370/208 |
| 2008/0132173 A1 * | 6/2008 | Sung et al. | 455/67.13 |

(Continued)

FOREIGN PATENT DOCUMENTS

WO WO2006138554 12/2006

(Continued)

OTHER PUBLICATIONS

J. Lee et al., "Symmetric Capacity of MIMO Downlink Channels," 2006 IEEE International Symposium on Information Theory, ISIT 2006, Jul. 2006, 5 pages.

(Continued)

*Primary Examiner*—Tesfaldet Bocure
*Assistant Examiner*—Lawrence B Williams
(74) *Attorney, Agent, or Firm*—Ryan, Mason & Lewis, LLP (57) ABSTRACT

A multiple-input, multiple-output (MIMO) communication system is configured to perform user scheduling with reduced channel station information. The system includes multiple terminals and at least one base station configured to communicate with the terminals. The base station is operative to obtain channel vector magnitudes for respective ones of the terminals, to identify a subset of the terminals based on the channel vector magnitudes, to obtain channel vector phase information for the identified subset of terminals, and to utilize the channel vector phase information to control transmission to the identified subset of terminals. The system may be, for example, a multi-user MIMO system in which the multiple terminals comprise autonomous single-antenna terminals.

20 Claims, 6 Drawing Sheets

U.S. PATENT DOCUMENTS

2009/0180405 A1* 7/2009 Ashikhmin et al. ......... 370/280
2010/0008431 A1* 1/2010 Wu et al. .................... 375/244

FOREIGN PATENT DOCUMENTS

WO PCTUS2008003951 7/2008

OTHER PUBLICATIONS

M. Sharif et al., "On the Capacity of MIMO Broadcast Channels with Partial Side Information," IEEE Transactions on Information Theory, Feb. 2005, pp. 506-522, vol. 51, No. 2.

M. Sharif et al., "Scaling Laws of Sum Rate Using Time-Sharing, DPC, and Beamforming for MIMO Broadcast Channels," 2004 International Symposium on Information Theory, ISIT 2004, Jun. 2004, p. 177.

M. Sharif et al., "A Comparison of Time-Sharing, DPC, and Beamforming for MIMO Broadcast Channels with Many Users," IEEE Transactions on Communications, Jan. 2007, pp. 1-14, vol. 55, No. 1.

M. Sharif et al., "Differentiated Rate Scheduling for Gaussian Broadcast Channels," 2005 International Symposium on Information Theory, ISIT 2005, Sep. 2005, 5 pages.

T. Yoo et al., "On the Optimality of Multiantenna Broadcast Scheduling Using Zero-Forcing Beamforming," IEEE Journal on Selected Areas in Communications, Mar. 2006, pp. 528-541, vol. 24, No. 3.

A. Vakili et al., "Differentiated Rate Scheduling for MIMO Broadcast Channels," Proc. 43rd Annual Allerton Conf. Comun. Control, Comput., 2004, 10 pages.

P. Viswanath et al., "Sum Capacity of the Vector Gaussian Broadcast Channel and Uplink-Downlink Duality," IEEE Transactions on Information Theory, Aug. 2003, pp. 1912-1921, vol. 49, No. 8.

P. Viswanath et al., "Opportunistic Beamforming Using Dumb Antennas," IEEE Transactions on Information Theory, Jun. 2002, pp. 1277-1294, vol. 48, No. 6.

S. Vishwanath et al., "Duality, Achievable Rates, and Sum-Rate Capacity of Gaussian MIMO Broadcast Channels," IEEE Transactions on Information Theory, Oct. 2003, pp. 2658-2668, vol. 49, No. 10.

G.A. Gupta et al., "Power Allocation Over Parallel Gaussian Multiple Access and Broadcast Channels," IEEE Transactions on Information Theory, Jul. 2006, pp. 3274-3282, vol. 52, No. 7.

N. Jindal et al., "Sum Power Iterative Water-Filling for Multi-Antenna Gaussian Broadcast Channels," IEEE Transaction on Information Theory, Apr. 2005, pp. 1570-1580, vol. 51, No. 4.

N. Jindal et al., "Dirty-Paper Coding Versus TDMA for MIMO Broadcast Channels," IEEE Transactions on Information Theory, May 2005, pp. 1783-1794, vol. 51, No. 5.

H. Viswanathan et al., "Downlink Capacity Evaluation of Cellular Networks with Known-Interference Cancellation," Jun. 2003, pp. 802-811, vol. 21, No. 5.

U.S. Appl. No. 11/553,191 filed in the name of T.L. Marzetta on Oct. 26, 2006 and entitled "MIMO Communication System with Variable Slot Structure."

W. Ajib et al., "An Overview of Scheduling Algorithms in MIMO-Based Fourth-Generation Wireless Systems," IEEE Network, IEEE Service Center, Sep./Oct. 2005, pp. 43-48, vol. 19, No. 5.

K. Kim et al., "Interference Mitigation in MIMO Systems by Subset Antenna Transmission," Wireless Personal Communications, Klower Academic Publishers, Aug. 2006, pp. 305-315, vol. 40, No. 3.

* cited by examiner

(a) BROADCAST CHANNEL (b) MULTIPLE ACCESS CHANNEL

MIMO COMMUNICATION SYSTEM WITH USER SCHEDULING BASED ON REDUCED CHANNEL STATE INFORMATION

FIELD OF THE INVENTION

The present invention relates generally to communication systems, and more particularly to multiple-input, multiple-output (MIMO) communication systems.

BACKGROUND OF THE INVENTION

In a typical multi-user MIMO communication system, a multi-antenna array in a base station sends multiple data streams selectively and simultaneously to autonomous single-antenna terminals, also referred to as "users," thereby achieving throughput gains relative to a set of single-antenna links. Multi-user systems of this type are sometimes referred to as "broadcast" MIMO systems. The converse to broadcast MIMO is sometimes referred to as "multiple access" MIMO, and it entails the autonomous single-antenna terminals sending multiple data streams simultaneously to the multi-antenna array in the base station.

One drawback of multi-user MIMO systems is that the base station has to know the propagation characteristics of the forward channel. The process through which the base station obtains this information is generally referred to as training. See, for example, U.S. Patent Application Publication No. 2005/0265290 to Hochwald et al. entitled "Feedback Method for Channel State Information of a Wireless Link," which is commonly assigned herewith and incorporated by reference herein. Each of the single-antenna terminals may generate forward channel state information in the form of a corresponding channel vector which characterizes the channel between the base station and that terminal. The channel vectors may be based on measurements made by the terminals using pilot signals transmitted by the base station over the forward channel. The terminals transmit their respective channel vectors back to the base station over the reverse channel. These channel vectors collectively form what is referred to as a forward channel matrix.

The base station utilizes the forward channel state information to perform scheduling operations such as, for example, determining which of the terminals will be served in a given time slot or other scheduling interval.

It is well known that the acquisition of forward channel state information by the base station can be considerably facilitated through the use of time-division duplex (TDD) operation. In the TDD context, the principle of reciprocity implies that the reverse channel matrix is equal to the transpose of the forward channel matrix, so the base station can readily obtain the required forward channel state information by simply processing pilot signals transmitted by the terminals over the reverse channel. Thus, TDD operation avoids the need for the terminals to generate channel vectors and transmit such channel vectors back to the base station.

However, in frequency division duplex (FDD) operation, the principle of reciprocity generally does not apply, and the generation and transmission of the above-noted channel vectors remains a requirement. The amount of overhead involved may be prohibitive, especially when the number of terminals is large, or when the channel characteristics are changing rapidly due to terminal mobility.

Accordingly, a need exists for techniques that can reduce the overhead burden associated with estimation of forward channel state information in a multi-user MIMO system, particularly one operating in an FDD mode.

SUMMARY OF THE INVENTION

The present invention in an illustrative embodiment allows users to be scheduled in a MIMO system in a manner that reduces the overhead associated with forward channel state information.

In accordance with an aspect of the invention, a MIMO system includes multiple terminals and at least one base station configured to communicate with the terminals. The base station is operative to obtain channel vector magnitudes for respective ones of the terminals, to identify a subset of the terminals based on the channel vector magnitudes, to obtain channel vector phase information for the identified subset of terminals, and to utilize the channel vector phase information to control transmission to the identified subset of terminals.

The system in the above-noted illustrative embodiment is a multi-user MIMO system in which the multiple terminals comprise autonomous single-antenna terminals. More specifically, in the multi-user MIMO system of the illustrative embodiment, the base station communicates with the multiple terminals via an antenna array comprising M antennas and the multiple terminals comprise K single-antenna terminals, where K is greater than M. The identified subset of the K terminals in this illustrative embodiment comprises a number of terminals greater than or equal to M. In other embodiments, one or more of the terminals may each comprise multiple antennas, rather than a single antenna.

The subset of terminals may be identified by, for example, determining approximate rates for respective ones of the terminals for which channel vector magnitudes are obtained, computing corresponding weighted approximate rates, and selecting the subset of terminals based on the weighted approximate rates. The approximate rate for a k-th one of the K terminals for which channel vector magnitudes are obtained may be given by:

$$\hat{R}_k(t) := \log\left(1 + \frac{P}{M}\|h_k(t)\|^2\right),$$

where t denotes a particular scheduling interval, M denotes number of base station transmission antennas, P denotes an available transmission power, and $\|h_k(t)\|$ denotes the channel vector magnitude obtained for the k-th terminal. The weighted approximate rate for the k-th terminal may be given by $w_k(t)\hat{R}_k(t)$, where $w_k(t)$ denotes a weight associated with the k-th terminal in scheduling interval t. In this embodiment, the subset of terminals may be selected based on the weighted approximate rates by selecting the terminals with the M largest weighted approximate rates.

Advantageously, the scheduling approach of the above-noted illustrative embodiment significantly reduces the overhead burden associated with scheduling based on forward channel state information in a multi-user MIMO system. This embodiment may achieve near-optimal performance using minimal forward channel state information, thereby overcoming the above-noted problems of conventional practice.

These and other features and advantages of the present invention will become more apparent from the accompanying drawings and the following detailed description.

DETAILED DESCRIPTION OF THE INVENTION

The present invention will be illustrated below in conjunction with exemplary multi-user MIMO systems and associated techniques for user scheduling based on channel state information. It should be understood, however, that the invention is not limited to use with any particular type of MIMO system, user scheduling algorithm or type of channel state information. The disclosed techniques are suitable for use with a wide variety of other MIMO systems which utilize various types of scheduling and channel state information, and in numerous alternative applications.

Aspects of the present invention may be implemented in otherwise conventional wireless networks such as cellular, Wi-Fi or WiMax networks, or in a wide variety of other types of wireless communication systems. The term "base station" as used herein is therefore intended to be construed broadly so as to encompass, by way of example, an access point of a wireless network, or any other type of wireless communication system entity which utilizes MIMO techniques to communicate with multiple users.

Figure 1:
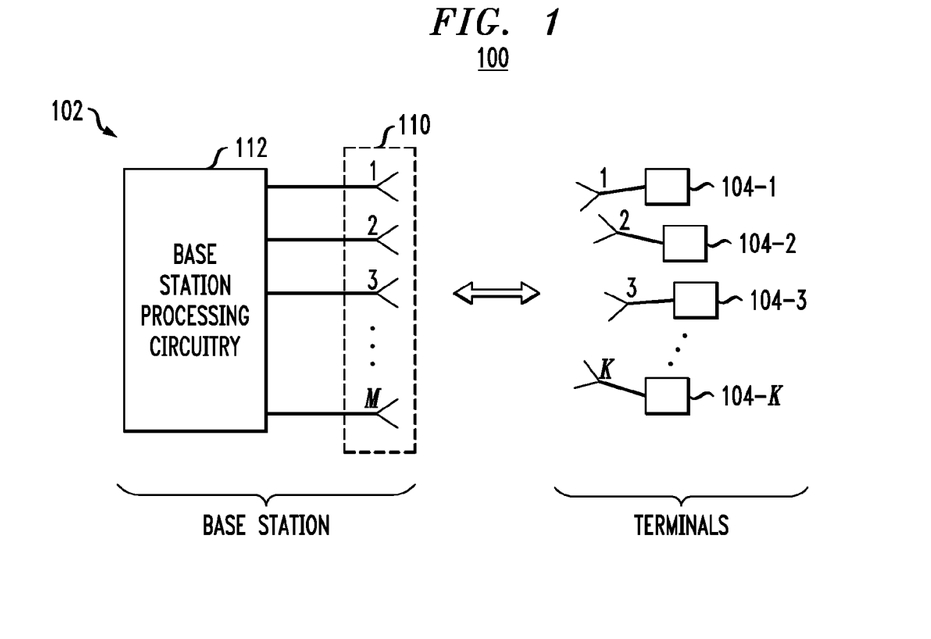
FIG. 1 is a simplified diagram of a multi-user MIMO communication system in an illustrative embodiment of the invention.

FIG. 1 shows a multi-user MIMO system 100 comprising a base station 102 which communicates with a plurality of wireless terminals more particularly denoted as 104-1, 104-2, . . . 104-K each equipped with a single antenna denoted 1, 2, 3, . . . K. These terminals are also referred to herein as "users." The terminals may be, for example, mobile telephones, portable computers, wireless email devices, personal digital assistants (PDAs) or other user communication devices, in any combination. The base station 102 includes an antenna array 110 comprising M antennas as shown, and base station processing circuitry 112. The base station 102 transmits information to the terminals 104 via a forward link or downlink, and received information from the terminals 104 via a reverse link or uplink.

In other embodiments, one or more of the terminals 104 may each comprise multiple antennas, rather than a single antenna as in the present illustrative embodiment. Those skilled in the art will appreciate that the techniques disclosed herein can be adapted in a straightforward manner for use with one or more such multi-antenna terminals.

Of course, a given MIMO system may include multiple base stations, and a number of different arrangements of terminals of various types.

Figure 3:
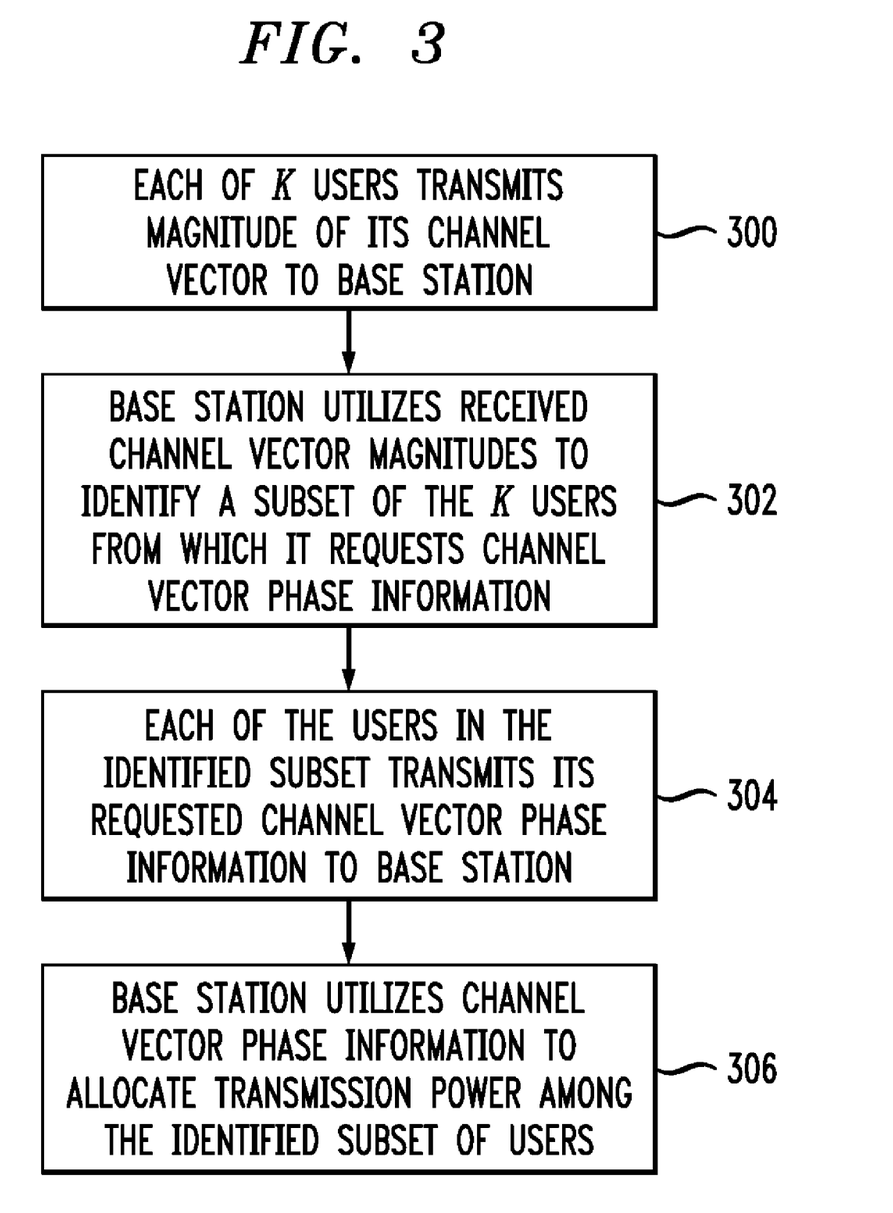
FIG. 3 is a flow diagram of an exemplary user scheduling process implemented in the FIG. 1 system.

It will be assumed for purposes of illustration that the system 100 operates in an FDD mode, although such operation is not a requirement of the invention. As noted above, the reciprocity principle generally does not apply in the FDD context, and so the base station is unable to obtain adequate forward channel state information simply by processing reverse link pilots transmitted by the terminals. Instead, in conventional practice, such a system would generally require forward channel vectors to be transmitted by each of the K terminals for a given time slot or other scheduling interval. The overhead associated with such an approach consumes an excessive amount of system resources, and is therefore undesirable. The illustrative embodiment overcomes this problem of the prior art by providing an approach in which user scheduling can be performed based on a substantially reduced amount of forward channel state information, while still obtaining near-optimal throughput performance.

Figure 2:
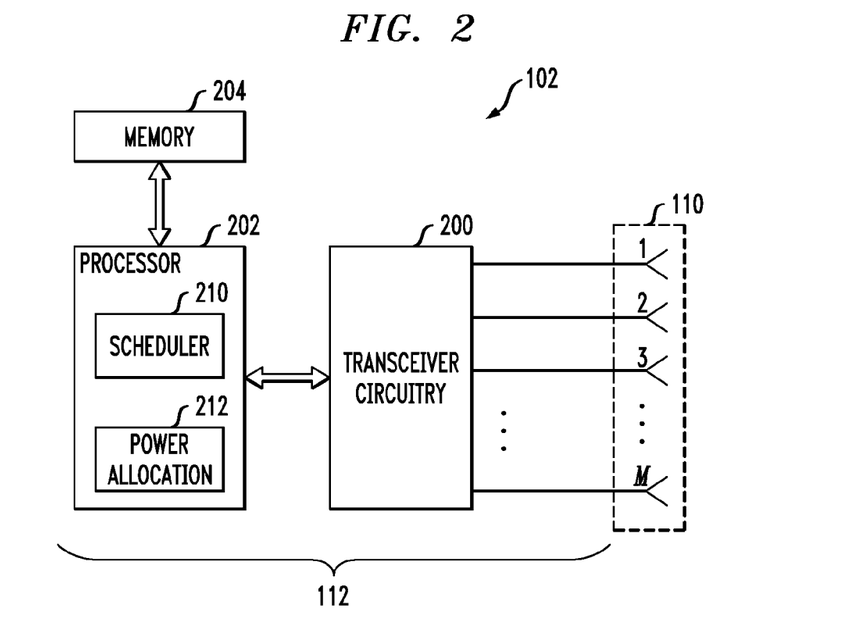
FIG. 2 shows a more detailed view of one possible implementation a base station of the FIG. 1 system.

FIG. 2 shows a more detailed view of one possible configuration of the base station 102 of multi-user MIMO system 100. In this embodiment, the base station 102 comprises transceiver circuitry 200, a processor 202 and a memory 204. The transceiver circuitry 200 maybe coupled to the M antennas of the antenna array 1 10 via respective forward link transmit power amplifiers and receive link receive preamplifiers, although such elements are omitted from the figure for clarity of illustration. The forward and reverse link communications may be separated from one another between the antenna array 110 and the transceiver circuitry 200 using, for example, diplexer filters or other conventional arrangements, as will be appreciated by those skilled in the art. The processor 202 implements a number of processing elements including a scheduler element 210 and a power allocation element 212. The operation of these elements will be described in greater detail below in conjunction with the user scheduling process shown in the flow diagram of FIG. 3.

One or more software programs for implementing a user scheduling process as described herein may be stored in memory 204 and executed by processor 202. The scheduler and power allocation elements 210 and 212 of the processor 202 may thus represent functional software components executed by the processor. The processor 202 may comprise multiple integrated circuits, digital signal processors or other types of processing devices, and associated supporting circuitry, in any combination. Of course, numerous alternative arrangements of hardware, software or firmware in any combination may be utilized in implementing the base station 102 or particular elements thereof.

Referring now to FIG. 3, a process for scheduling users based on a reduced amount of forward channel state information is shown. In this embodiment, each user is assumed to be one of the K terminals of system 100.

In step 300, each of the K users 104 transmits the magnitude of its channel vector to the base station 102. The magnitude of a channel vector is also referred to herein as the "norm" of a channel vector. Although each of the K users in this embodiment transmits the magnitude of its channel vector, other arrangements are possible. For example, in one alternative arrangement, only those of the K users whose channel vector magnitudes exceed a certain threshold may transmit their channel vector magnitudes to the base station. These and other similar arrangements can serve to achieve further reductions in the amount of channel state information communicated by the users.

In step 302, the base station utilizes the received channel vector magnitudes to identify a subset of the K users from which the base station requests channel vector phase information. This is an example of what is more generally referred to herein as a scheduling operation. Thus, the identified subset is a subset of the K users that the base station will consider for scheduling in a given scheduling interval. The scheduling intervals may comprise time slots, although such time slot scheduling is not required.

In step 304, each of the users in the identified subset transmits its requested channel vector phase information to the base station. Thus, the complete channel vector, comprising both its magnitude and phase, is requested from only the identified subset of the K users, rather than from each of the K users. This substantially reduces the overhead associated with obtaining forward channel state information in the system 100. As indicated in conjunction with step 302, the identification of the subset of users is based on their respective channel vector magnitudes, and the transmission of such information can be accomplished with minimal overhead.

In step 306, the base station utilizes the channel vector phase information to allocate transmission power among the identified subset of users. This allocation of power among the identified subset of the K users may be done in a number of different ways, as will be described in greater detail below.

In other embodiments, the allocation of power in step 306 may be based simply on dividing the power evenly among the identified subset of users. For such embodiments, the step 304 may be eliminated, and step 306 may divide the available power evenly among the identified subset of users, without any use of channel vector phase information.

It should be noted that the steps 300 through 306 in FIG. 3 are generally associated with a single scheduling interval, such as a time slot. Thus, the users of the identified subset as determined in step 302 are served in that scheduling interval. These steps may then be repeated for one or more subsequent scheduling intervals.

The base station operations associated with the process as illustrated in FIG. 3 may be implemented using one or more software programs stored in memory 204 and executed by processor 202, as previously indicated. The wireless terminal operations associated with the FIG. 3 process may similarly be implemented in software stored and executed by respective memory and processor elements of the wireless terminals.

Detailed examples of the manner in which a subset of the K users may be identified and scheduled for service in the system 100 will now be described with reference to FIGS. 4 through 11. In these examples, particular MIMO system models and operating characteristics are assumed for illustrative purposes. It should be emphasized, however, that these and any other assumptions made herein are not requirements of the invention, and need not apply in other embodiments.

As described above, base station 102 in the illustrative embodiment comprises M antennas that communicate with K autonomous single-antenna terminals 104. The examples to be described below provide scheduling algorithms that select a subset of at most M users based on weights, channel magnitudes, and various degrees of phase information. Numerical experiments indicate that these illustrative scheduling algorithms perform quite well, even for a moderate number of users.

Figure 4:
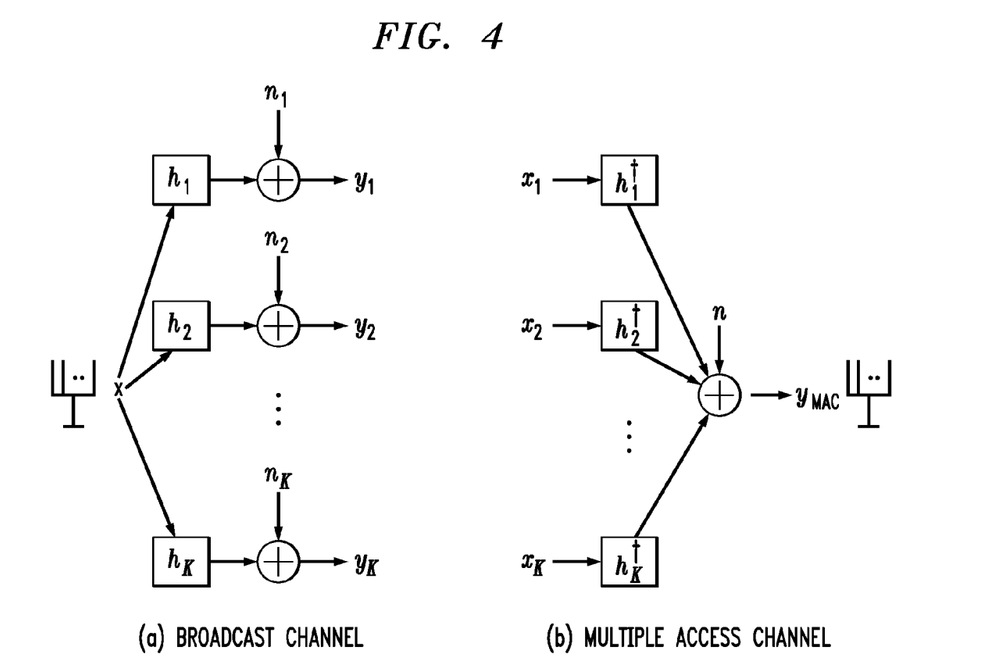
FIGS. 4(a) and 4(b) show models of respective broadcast and multiple access channels of the FIG. 1 system.

With reference now to FIG. 4, an exemplary model is shown for characterizing the operation of the multi-user MIMO system 100 of FIG. 1. This model assumes M>1 base station antennas and K terminals each with a single antenna, as shown in FIG. 1. FIG. 4(a) shows the broadcast channel (BC), that is, the forward channel from the base station 102 to the terminals 104. FIG. 4(b) shows the corresponding multiple access channel (MAC), that is, the reverse channel from the terminals 104 to the base station 102.

The examples below will be described in the context of the BC, with the base station 102 being referred to as a transmitter and the terminals being referred to as receivers. Let $x \in C^{M \times 1}$ be the transmitted vector signal and let $h_k \in C^{1 \times M}$ be the channel vector of the k-th receiver. Denote by $H = [h_1^\dagger h_2^\dagger \ldots h_K^\dagger]^\dagger$ the concatenated channel matrix of all K receivers. For now, we assume the matrix H is arbitrary but fixed. We further assume that the transmitter has perfect channel state information, i.e., exact knowledge of the matrix H. The circularly symmetric complex Gaussian noise at the k-th receiver is $n_k \in C$ where $n_k$ is distributed according to N(0,1). Thus the received signal at the k-th receiver is $y_k = h_k x + n_k$. The covariance matrix of the transmitted signal is $\Sigma_x = E[xx^\dagger]$. The transmitter is subject to a power constraint P, which implies $Tr(\sigma_x) \leq P$. Here Tr denotes the trace operator, which is the sum of the diagonal elements of a square matrix.

The capacity region of the BC will now be described. Let $\pi(k)$, $k=1, \ldots, K$, be a permutation of $k=1, \ldots, K$. As shown in S. Vishwanath et al., "Duality, achievable rates and sum-rate capacity of MIMO broadcast channels," IEEE Trans. Inf. Theory, Vol. 49, No. 10, pp. 2658-2668, the following rate vector is achievable using conventional Dirty Paper Coding (DPC):

$$R_{\pi(k)} = \log\left(\frac{1 + h_{\pi(k)}\left(\sum_{l \leq k} \Sigma_{\pi(l)}\right) h_{\pi(k)}^\dagger}{1 + h_{\pi(k)}\left(\sum_{l < k} \Sigma_{\pi(l)}\right) h_{\pi(k)}^\dagger}\right), k = 1, \ldots, K.$$

The DPC region is defined as the convex hull of the union of all such rate vectors, over all positive semi-definite covariance matrices that satisfy the power constraint $\sum_{k=1}^{K} Tr(\Sigma_k) \leq P$, and over all possible permutations $\pi(k)$. It has been shown that DPC in fact achieves the entire capacity region denoted as $C_{BC}$. The weighted sum capacity $C_{BC}^w(H, P)$ for any weight vector $w \in R_+^K$ can therefore be written as $$C_{BC}^w(H, P) = \max_{R \in C_{BC}} \sum_{k=1}^{K} w_k R_k \quad (1)$$

$$= \max_{\pi} \max_{\Sigma_k \geq 0, \sum_{k=1}^{K} Tr(\Sigma_k) \leq P} \sum_{k=1}^{K} w_{\pi(k)} \log$$

$$\left(\frac{1 + h_{\pi(k)}\left(\sum_{l \leq k} \Sigma_{\pi(l)}\right) h_{\pi(k)}^\dagger}{1 + h_{\pi(k)}\left(\sum_{l < k} \Sigma_{\pi(l)}\right) h_{\pi(k)}^\dagger}\right).$$

The maximization in (1) involves a non-concave function of the covariance matrices, which makes it hard to deal with analytically as well as numerically. However, a duality has been shown to exist between the BC and the MAC with a sum-power constraint P. That is, the dual MAC which is formed by reversing the roles of transmitters and receivers, as represented in FIG. 4(b), has the same capacity region as the BC. Note that $C_{BC}^w(H, P) = \sum_{k=1}^{K} \Delta w_k S_k$, with $S_k := \sum_{l=1}^{k} R_l$ the partial sum rate of the first k users and $\Delta w_k := w_k - w_{k+1}$, with the convention that $w_{K+1} = 0$. Without loss of generality we assume that the users are indexed such that $w_1 \leq w_2 \geq \ldots \leq w_K$. Using the duality result, the weighted sum capacity (1) of the BC can thus be expressed in terms of the dual MAC weighted sum rate as $$C_{BC}^w(H, P) = \max_{\sum_{k=1}^{K} P_k \leq P} \sum_{k=1}^{K} \Delta w_k \log\det\left(I_M + \sum_{l=1}^{k} P_l h_l^\dagger h_l\right), \quad (2)$$

where $P_k \geq 0$ denotes the power allocated to the k-th receiver. As a special case of (2) with $w_k=1, k=1, \ldots$, the sum capacity is obtained as $$C_{BC}^{sum}(H, P) = \max_{\Sigma_{k=1}^{K} P_k \leq P} \log\det\left(I_M + \sum_{k=1}^{K} P_k h_k^\dagger h_k\right). \quad (3)$$

Since log det(•) is a concave function on the set of positive-definite matrices, the problems in (2) and (3) only involve maximizing a concave objective function subject to convex constraints. Specialized algorithms have been developed to solve these problems. See, for example, N. Jindal et al., "Sum power iterative water-filling for multi-antenna Gaussian broadcast channels," IEEE Trans. Inf. Theory, Vol. 51, No. 4, pp. 1570-1580, 2005, and H. Viswanathan et al., "Downlink capacity evaluation of cellular networks with known interference cancellation," IEEE J. Sel. Areas Commun., Vol. 21, No. 5, pp. 802-811, 2005.

The weighted sum rate maximization problem, and associated bounds for the weighted sum rate, will now be described in greater detail. Denote by $h_{(k)}$ the channel vector of the receiver with the k-th largest norm, i.e., $\|h_{(1)}\| \geq \|h_{(2)}\| \geq \ldots \geq \|h_{(K)}\|$. In this case the upper bound for the sum capacity is as follows.

$$C_{BC}^{sum}(H, P) \leq M\log\left(1 + \frac{P}{M}\|h_{(1)}\|^2\right). \quad (4)$$

See, for example, N. Jindal and A. Goldsmith, "Dirty-paper coding versus TDMA for MIMO broadcast channels," IEEE Trans. Inf. Theory, Vol. 51, No. 5, pp. 1783-1794, 2005. Observe that the above bound can be achieved when there are M receivers with orthogonal channel vectors tied for the maximum norm $\|h_{(1)}\|$.

A generic upper bound for the weighted sum rate for any given set of channel vectors is given by:

$$C_{BC}^{w}(H, P) \leq \max_{\Sigma_{k=1}^{K} P_k \leq P} \Delta w_1 \log(1 + P_1 \|h_1\|^2) + M \sum_{k=2}^{K} \Delta w_k \log\left(1 + \sum_{l=1}^{k} \frac{P_l}{M} \|h_l\|^2\right).$$

This upper bound can also be formulated as follows:

$$C_{BC}^{w}(H, P) \leq \max_{\Sigma_{k=1}^{K} P_k \leq P/M} \sum_{k=1}^{K} \Delta w_k \log\left(1 + \sum_{l=1}^{k} P_l \|h_l\|^2\right). \quad (5)$$

In order to develop a suitable asymptotic framework, we assume that there are C classes of users, with $K_c$ the number of class-c users and $\Sigma_{c=1}^{C} K_c = K$. Let $h_k^{(c)}$ be the channel vector of the k-th class-c user. We let $w_c$ be the weight associated with class c, and define $\Delta w_c := w_c - w_{c+1}$ with the convention that $w_{C+1}=0$. Let $T_c$ be the total rate received by class c. Thus the weighted sum rate is $T := \Sigma_{c=1}^{C} w_c T_c$. Without loss of generality, we assume that the classes are indexed such that $w_1 \geq w_2 \geq \ldots \geq w_C$. Let $h_{(k)}^{(c)}$ be the channel vector of the class-c user with the k-th largest norm, i.e., $\|h_{(1)}^{(c)}\| \geq \|h_{(2)}^{(c)}\| \geq \ldots \geq \|h_{(K_c)}^{(c)}\|$.

The upper bound in (5) can be specialized to a class-based system, as follows. For any given set of channel vectors, $$\sum_{c=1}^{C} w_c T_c \leq U(w_c; \|h_{(1)}^{(c)}\|; P): \quad (6)$$

$$= M \max_{\Sigma_{c=1}^{C} P_c \leq P/M} \sum_{c=1}^{C} \Delta w_c \log\left(1 + \sum_{d=1}^{c} P_d \|h_{(1)}^{(d)}\|^2\right).$$

Note that when all weights are taken equal to one, the upper bound in (5) reduces to that in (4) for the sum rate. Recall that the upper bound in (4) is tight in the sense that it can actually be achieved when there are M users with orthogonal channel vectors tied for the maximum norm. Likewise, the upper bound in (6) can be attained for a particular configuration of channel vectors. Specifically, assume that there are M unit orthogonal vectors $u_m \in C^M$, where C is the set of complex numbers and $m=1, \ldots, M$. That is, $\|u_m\|=1$ for all m, $<u_m, u_n>=0$, $m \neq n$. Further assume that there are MC users, M from each class, with channel vectors $h_{u_c^m}^{(c)}$, $c=1, \ldots, C$, $m=1, \ldots, M$, that satisfy the following two properties: (i) within each class, all M users are tied for the maximum norm, i.e., $\|h_{u_c^m}^{(c)}\| = \|h_{(1)}^{(c)}\|$ for all $c=1, \ldots, C$, $m=1, \ldots, M$; and (ii) the channel vector of one of the users of each class is parallel to $u_m$ and thus orthogonal to $$u_n, m \neq n, \text{ i.e., } <u_m, h_{u_c^m}^{(c)}> = \|h_{u_c^m}^{(c)}\|$$

and $$<u_n, h_{u_c^m}^{(c)}> = 0 \text{ for all } c = 1, \ldots, C.$$

Figure 5:
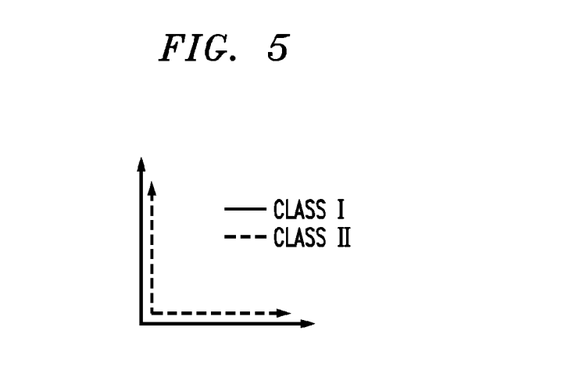
FIG. 5 shows a plot of optimal configuration for a given number of user classes and transmit antennas in an illustrative embodiment.

The second property above implies that all the $u_m$-users are orthogonal to all the $u_n$-users, i.e., $$<h_{u_c^m}^{(c)}, h_{u_d^n}^{(d)}> = 0$$

for all c, d=1, ..., C, $m \neq n$. For brevity, the above-described constellation of channel vectors will be referred to herein as the "optimal configuration." FIG. 5 provides a pictorial representation of the optimal configuration for the case of C=2 user classes and M=2 transmit antennas. The axes in this figure represent two orthogonal directions in a two-dimensional complex space.

As mentioned above, the optimal configuration in fact achieves the upper bound in (6). In order to see this, let $P_1^*(K), \ldots, P_C^*(K)$ be the optimizing power levels of the upper bound in (6) for given values of $\|h_{(1)}^{(c)}\|$, $c=1, \ldots, C$, i.e., $$P^*(K) = (P_1^*(K), \ldots, P_C^*(K)):$$

$$= \arg\max_{\Sigma_{c=1}^{C} P_c \leq P/M} \sum_{c=1}^{C} \Delta w_c \log\left(1 + \sum_{d=1}^{c} P_d \|h_{(1)}^{(d)}\|^2\right).$$

Now suppose that we assign power $P_c^*(K)$ to all M class-c users in the optimal configuration, and arrange the users in order of increasing class index in the DPC sequence. Because of the orthogonality, the partial sum rate $S_c := \sum_{d=1}^{c} T_d$ of the first c classes will be $$S_c = M \log\left(1 + \sum_{d=1}^{c} P_d^*(K) \|h_{(1)}^{(d)}\|^2\right).$$

Since the total weighted sum rate maybe written as $\sum_{c=1}^{C} w_c T_c = \sum_{c=1}^{C} \Delta w_c S_c$, it follows that the optimal configuration indeed achieves the upper bound in (6).

It should be noted that $S_c$ also equals M times the partial sum rate in a corresponding single-antenna system with channel norms $\|h_{(1)}^{(c)}\|$ and powers $P_c^*(K)$, $c=1, \ldots, C$. Thus, the upper bound in (6) represents M times the weighted sum rate in such a single-antenna system.

In the following we focus on the case of M=2 transmit antennas. The upper bound in (6) then becomes:

$$\sum_{c=1}^{C} w_c T_c \leq U(w_c; \|h_{(1)}^{(c)}\|; P): \quad (7)$$

$$= 2 \max_{\sum_{c=1}^{C} P_c \leq P/2} \sum_{c=1}^{C} \Delta w_c \log\left(1 + \sum_{d=1}^{c} P_d \|h_{(1)}^{(d)}\|^2\right).$$

A lower bound can also be specified as follows. Consider a scheme that assigns power $P_c^*$ to class-c users $u_c$ and $v_c$ with channel vectors $h_{u_c}^{(c)}$ and $h_{v_c}^{(c)}$, respectively, $c=1, \ldots, C$, and arranges users in order of increasing class index in the DPC sequence. Let $\hat{T}_c$ and $\hat{S}_c := \sum_{d=1}^{c} \hat{T}_c$ be the resulting total rate received by class c and the partial sum rate of the first c classes, respectively. Let $V_c := \min_{d,e=1,\ldots,c} V^{(d),(e)}$, with $V^{(d),(e)} := 1 - I(h_{u_d}^{(d)}, h_{v_e}^{(e)})$, where $I(.,.)$ denotes squared normalized inner product, which is further described below. Then $\sum_{c=1}^{C} w_c \hat{T}_c = \sum_{c=1}^{C} \Delta w_c \hat{S}_c$, with $$\hat{S}_c \geq \log\left(1 + \sum_{d=1}^{c} P_d^* \|h_u^{(d)}\|^2\right) + \log\left(1 + \sum_{d=1}^{c} P_d^* \|h_v^{(d)}\|^2\right) + \log(V_c).$$

Note that the above lower bound coincides with the upper bound in (7) if $h_{u_c}^{(c)}, h_{v_c}^{(c)}$, $c=1, \ldots, C$, form the optimal configuration of channel vectors, i.e., $\|h_{u_c}^{(c)}\| = \|h_{v_c}^{(c)}\| = \|h_{(1)}^{(c)}\|$ for all $c=1, \ldots, C$, and $\langle h_{u_c}^{(c)}, h_{v_d}^{(d)} \rangle = 0$, so that $V^{(d),(e)} = 1$ for all $c,d=1, \ldots, C$.

The lower and upper bounds for the weighted sum rate as described above hold for any arbitrary but fixed set of channel vectors. In order to derive asymptotic results, we will assume the channel vectors to be random and focus on the expected weighted sum rate. Within each class we assume the channel vectors to be independent and identically distributed, i.e., $h_1^{(c)}, h_2^{(c)}, \ldots$ are i.i.d. copies of some random vector $h^{(c)} \in \mathbb{C}^2$. Among the various classes, the channel vectors may however have different statistical characteristics. The numbers of users of the various classes are assumed to grow large in fixed proportions, i.e., $K_c = \alpha_c K$ for fixed coefficients $\alpha_1, \ldots, \alpha_C$ with $\sum_{c=1}^{C} \alpha_c = 1$.

We assume that the distributions of the channel vectors satisfy the following properties. For any two vectors $g, h \in \mathbb{C}^M$, denote by $I(g,h) := |\langle g,h \rangle|^2 / \|g\|^2 \|h\|^2$ their squared normalized inner product.

Property 1 The norm $\|h^{(c)}\|$ and the normalized vector $g^{(c)} = h^{(c)}/\|h^{(c)}\|$ are independent.

Property 2 Denote $F^{c,d}(u) := \Pr\{\langle g^{(c)}, g^{(d)} \rangle < \} = \Pr\{I(h^{(c)}, h^{(d)}) \leq u\}$. The distribution function $F^{c,d}(\cap)$ has maximum density $f_{max} < \infty$ and non-zero density at both 0 and 1, i.e., there exist constants $A_1, A_2 > 0$ such that $F^{c,d}(u) \geq A_1 u$ and $1 - F^{c,d}(1-u) \geq A_2 u$ for all $u \in [0,1]$, $c,d = 1, \ldots, C$. Taking $u=1$, it is seen that we must have $A_1, A_2 \leq 1$.

Property 3 Let $L_c(K)$ be an integer-valued sequence such that $L_c(K) = O(K^{\delta})$ as $K \to \infty$ for some given $\delta > 0$. There exists a function $B(K)$, with $\lim_{K \to \infty}(K) = \infty$, $B(K) = o(K)$ as $K \to \infty$, and coefficients $\beta_c > 0$, $c=1, \ldots, C$, such that: (i) $E\lfloor(\|h_{(1)}^{(c)}\|^2 - \beta_c^2 B(K))^+\rfloor = o(B(K))$ as $K \to \infty$, with $(x)^+ := \max\{0,x\}$; and (ii) for every $\epsilon < \delta/2$, $\Pr\{\|h_{(L_c(K))}^{(c)}\|^2 \leq (1-\epsilon)\beta_c^2 B(K)\} = o((\log(B(K)))^{-1})$ as $K \to \infty$.

The above properties are satisfied for example in case $h^{(c)} = \beta_c h$, $c=1, \ldots, C$, where the components of h are independent and distributed according to $N(0,1)$, with $F^{c,d}(u) = 1 - (1-u)^{M-1}$ and $B(K)$ behaving as $\log(K \cdot) + \log(\log(K))$.

In that case, the components $g_m^{(c)}$ of the normalized vector $h^{(c)}/\|h^{(c)}\|$ are distributed as $\sqrt{Z_m} e^{i\phi_m}/\sqrt{E(M)}$, where $\phi_m$ are i.i.d. uniform random variables in $[0, 2\pi]$, $Z_m$ are i.i.d. unit exponential random variables, and $E(M) = Z_1 + \ldots, Z_M$. Note that the components $g_m^{(c)}$ are thus distributed as $\sqrt{I_m} e^{i\phi_m}$, where $I_m$ is the time between the $(m-1)$-th and m-th event of a Poisson process with $M-1$ events in $[0,1]$, independent of $\|h^{(c)}\| = \beta_c E(M)$, so that Property 1 is satisfied. Also, $F^{c,d}(u) = u$, so that Property 2 is satisfied with $f_{max} = 1$ and $A_1 = A_2 = 1$. Furthermore, Property 3 is satisfied with $B(K)$ behaving as $\log(K) + \log(\log(K))$.

In the above-described case the components of the channel vectors are independent and distributed according to $N(0,1)$, which represents a rich scattering environment. A fundamentally different scenario is $h^{(c)} = \beta_c \|h\| e^{i\phi} u$, with $u_m = e^{m i \xi \sin(\theta)}$, $m = 1, \ldots, M$, $\xi > 0$ some constant, which corresponds to plane-wave characteristics. In the latter case, the components of a given channel vector all have the same norm and a fixed phase offset, and are thus in fact perfectly correlated. However, the above properties are still satisfied under mild assumptions on the distribution of h, $\phi$ and $\theta$.

It can be shown that the upper bound in (6) is asymptotically achievable by transmitting to a selected subset of MC users. There exists with high probability a group of MC users with channel vectors close to the optimal configuration in the heterogeneous case when the total number of users is large. It can be shown that selecting such a group of MC users and allocating power $P_c^*$ to each of the class-c users, where $$P^* = (P_1^*, \ldots, P_C^*) := \arg \max_{\sum_{c=1}^{C} P_c \leq P/M} \sum_{c=1}^{C} \Delta w_c \log\left(\sum_{d=1}^{c} P_d \beta_d^2\right)$$

asymptotically achieves the upper bound in (6). Define $$V(w_c; \beta_c; Q) := \max_{\sum_{c=1}^{C} P_c \leq Q} \sum_{c=1}^{C} \Delta w_c \log\left(\sum_{d=1}^{c} P_d \beta_d^2\right)$$

$$= \sum_{c=1}^{C} \Delta w_c \log\left(\sum_{d=1}^{c} P_d^* \beta_d^2\right).$$

Note that $V(w_c; \beta_c; Q) = V(w_c; \beta_c; 1) + w_1 \log(Q)$, and that the power levels $(P_1^*, \ldots, P_C^*)$ are the limiting values of $(P_1^*(K), \ldots, P_C^*(K))$ when the norms $\|h_{(1)}^{(c)}\|^2$ grow large as $\beta_c B(K)$. It may be shown that $(P_1^*(K), \ldots, P_C^*(K))$ converge to $(P_1^*, \ldots, P_C^*)$ as $K \to \infty$. In the case of two user classes, i.e., $C=2$, it may be shown that $$P_1^* := \frac{w_1 - w_2}{w_1} \frac{\beta_2^2}{\beta_2^2 - \beta_1^2} \frac{P}{M},$$

provided $w_1\beta_1^2 \leq w_2\beta_2^2$ while $P_1^* = P/M$ otherwise, and $P_2^* = P/M - P_1^*$.

A number of exemplary user selection schemes will now be described. These include selection schemes referred to as the "list" scheme and the "cone" scheme. Although described for the case of $M=2$ transmit antennas, these schemes easily extend to an arbitrary number of transmit antennas.

List Scheme

The list scheme first identifies for each class the users with norms close to the maximum, and then selects a nearly orthogonal pair of users among these. Specifically, the list scheme first selects the class-1 user with the largest norm $\|h_{(1)}^{(1)}\|$. Let the channel vector of this user be $h_{v_1}^{(1)} = h_{(1)}^{(1)}$. It then considers the class-1 users with the L next largest norms, and selects the user whose channel vector is most orthogonal to $h_{(1)}^{(1)}$, i.e., the user that minimizes $I(h_{(k)}^{(1)}, h_{(1)}^{(1)})$. Let the channel vector of this user be $h_{u_1}^{(1)}$, and $I_1 := I(h_{u_1}^{(1)}, h_{(1)}^{(1)})$. Next, it identifies the class-c users with the $2L_c$ largest norms and divides these in two groups of size $L_c$ each, for example, odd ones and even ones. Within the first group, it selects the user whose channel vector is most parallel to $h_{(1)}^{(1)}$, i.e., the user that maximizes $I(h_{(2k-1)}^{(1)}, h_{(1)}^{(1)})$. Let the channel vector of this user be $h_{v_c}^{(c)}$, and $V_c := 1 - I(h_{(1)}^{(1)}, h_{v_c}^{(c)})$. Finally, it selects within the second group of class-c users the user whose channel vector is most orthogonal to $h_{(1)}^{(1)}$, i.e., the user that minimizes $I(h_{(2k)}^{(1)}, h_{(1)}^{(1)})$. Let the channel vector of this user be $h_{u_c}^{(c)}$, and $I_c := I(h_{(1)}^{(1)}, h_{u_c}^{(c)})$.

Cone Scheme

The cone scheme first identifies users that are close to orthogonal, and then selects the ones with the largest norms among these. Specifically, it first picks two orthogonal vectors $u,v \in C^2$, i.e., $\langle u,v \rangle = 0$ and some small tolerance margin $\delta > 0$. Then it finds the class-c user with the largest norm among those with $I(u, h_k^{(c)}) \geq 1 - \delta$. Let the channel vector of this user be $h_{u_c}^{(c)}$. Similarly, it selects the class-c user with the largest norm among those with $I(v, h_k^{(c)}) \geq 1 - \delta$. Let the channel vector of this user be $h_{v_c}^{(c)}$.

After selecting the users as described above, both the list and the cone schemes allocate power $P_c^*$ to each of the class-c users. Define $\hat{T}_c$ as the rate received by class c under the list scheme, i.e., the sum rate of the M class-c users selected, and denote by $\hat{T} := \sum_{c=1}^{C} w_c \hat{T}_c$ the total weighted sum rate. It can be shown that the list scheme achieves a finite gap that vanishes to zero as the list size grows large, and thus it asymptotically maximizes the expected weighted sum rate. In a similar fashion, it can be shown that the cone scheme asymptotically achieves the maximum weighted sum rate.

Furthermore, scheduling a suitably selected group of MC users asymptotically achieves the upper bound (6) and thus maximizes the expected weighted sum rate. In fact, scheduling M users of each of the classes $c \in C^*$ is sufficient to asymptotically achieve the maximum expected weighted sum rate, where $C^* := \{c : P_c^* > 0\}$. It is assumed in this case that $P_1^* > 0$, even when $\beta_1$ is arbitrarily small compared to $\beta_c$, $c=2, \ldots, C$, provided $w_1 \geq w_2 \geq \ldots \geq w_C$. In other words, the class with the highest weight must asymptotically always be scheduled, even when its users have poor channels. If $w_c \geq w_d$ and $\beta_c \geq \beta_d$, then we will always have $P_d^* = 0$. Also, if $w_c \geq w_d$ and $w_c \beta_c^2 \geq w_d \beta_d^2$, then $P_d^* = 0$.

The results described above show that transmitting to a suitably selected group of MC users asymptotically achieves the maximum expected weighted sum rate. Specifically, two exemplary schemes were described, the list and the cone schemes, for selecting such a group of users. It is worth observing that the two schemes primarily served to obtain provable performance guarantees, and may not necessarily be ideal for actual implementation. First of all, both schemes inherently rely on a class structure, which is essentially a mathematical abstraction that may not have direct bearing on an actual system. Secondly, even though both schemes only transmit to a small subset of the users, they involve a considerable amount of channel state information for a potentially large population in selecting that subset.

The illustrative embodiment of the invention as previously described in conjunction with the flow diagram of FIG. 3 may be advantageously implemented using simplified versions of the list and cone schemes, which bypass the class framework and reduce the feedback burden while retaining the beneficial features of the two schemes in identifying a subset that is close to the optimal configuration. Thus, attention will now be turned from list and cone schemes, which are provably asymptotically optimal, to simpler heuristic schemes.

We note that the total rate received by class 1 users grows as $M[\log(B(K)) + \log(P_1^*) + 2 \log(\beta_1)]$, while the total rate received by class c, $c=2, \ldots, C$, asymptotically converges to $M[\log(\sum_{d=1}^{c} P_d^* \beta^2) - \log(\sum_{d=1}^{c-1} P_d^* \beta_d^2)]$. Thus, asymptotically, the overwhelming fraction of the aggregate weighted sum rate is accounted for by class 1. This indicates that transmitting to M class-1 users suffices to achieve asymptotically near-optimal performance.

In order to investigate this more comprehensively, we now analyze the degree of suboptimality that would be incurred when only M users of the classes $c \in D$, $D \subset \{1, \ldots, C\}$, are allowed to be scheduled. Let $V^D$ be the maximum achievable value of $V(w_c; \beta_c; P/M)$ when only the $P_c$, $c \in D$, are allowed to be non-zero, and let $P_c^D$ be the corresponding optimizing values, i.e., $V^D = \sum_{c \in D} \Delta w_c \log(\sum_{d=1}^{c} P_d^D \beta_d^2)$. Denote by $\hat{T}_c^D$ the rate received by class c under a scheme which selects users in the same manner as before, but now allocates power $P_c^D$ to each of the class-c users, rather than $P_c^*$, and define $\hat{T}^D := \sum_{c \in D} w_c \hat{T}_c^D$ as the total weighted sum rate. Thus, only users of classes c with $P_c^D > 0$ will be scheduled. Denote $c_D := \min_{c \in D} c$. It holds that we must always have $P_{c_D}^D > 0$, even when $\beta_{c_D}$ is arbitrarily small.

Assuming that $L_c(K)$ is such that $\lim_{K \to \infty}(K) = \infty$ and $L_c(K) \leq o(K^\delta)$ as $K \to \infty$ for any $\delta > 0$, it can be shown that $$\lim_{K \to \infty} \mathbb{E}[U(w_c; \|h_{(1)}^{(c)}\|; P)] - \mathbb{E}[\hat{T}^D] - M[w_1 - w_{c_D}]\log(B(K)) =$$
$$M[V(w_c; \beta_c; P/M) - V^D].$$

This proposition shows that scheduling M users of classes $c \in D$ asymptotically leaves a performance gap of $M[V(w_c; \beta_c; P/M) - V^D]$, provided $1 \in D$. Note that the performance gap is linear in the number of antennas, which is consistent with the decomposition into M single-antenna systems as noted previously. In particular, scheduling M class-1 users leaves a performance gap of $M[V(w_c; \beta_c; P/M) - w_1[\log(P/M) - 2 \log(\beta_1)]] = M[V(w_c; \beta_c; 1) - 2w_1 \log(\beta_1)]$.

If $1 \in D$, then the performance gap grows with K as $M[w_1 - w_{c_D}] \log(B(K))$.

As noted previously in conjunction with the illustrative embodiment of FIG. 3, the user selection decision in step 302 of the flow diagram may be made using only the channel vector magnitudes, that is, the vector norms alone, and no channel vector phase information. The overall performance gap associated with scheduling Musers based on channel vector norms alone is given by:

$$M[V(w_c;\beta_{c;1})-2w_1\log(\beta_1)]+w_1(M-1).$$

The term $w_1(M-1)$ represents the loss due to non-orthogonality, attributable to use of the channel vector norms with no phase information, whereas the remaining term $M[V(w_c;\beta_c;1)-2w_1\log(\beta_1)]$ accounts for the loss due to the fact that only class-1 users are scheduled rather than users from all classes. It should be noted that the overall performance gap is also a linear function of the number of antennas.

A number of numerical simulations were performed to verify that the above-described scheduling of only M class-1 users based on channel vector norms does not significantly degrade performance. These numerical simulations will now be described with reference to the plots of FIGS. 6 through 11.

Figure 6:
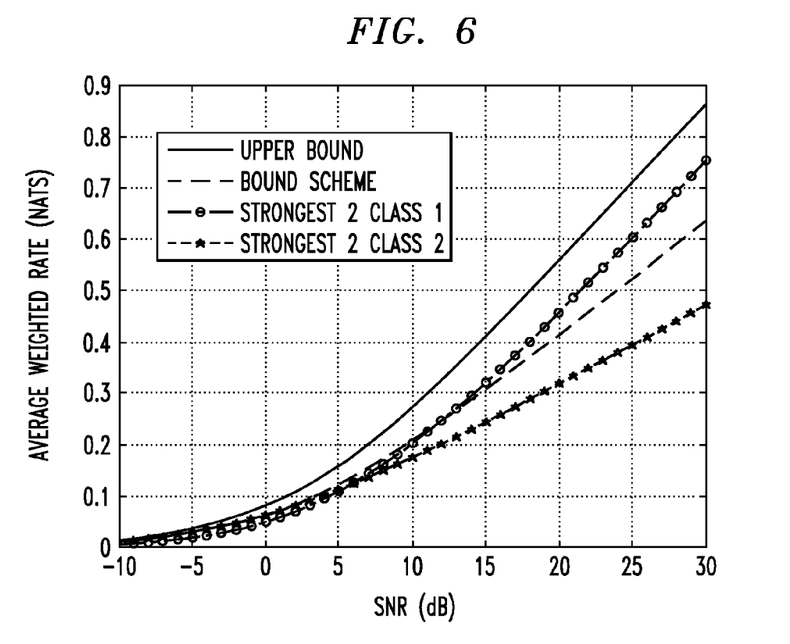
FIGS. 6, 7 and 8 are plots of weighted rate as a function of signal-to-noise ratio (SNR) in illustrative embodiments of the invention.
Figure 7:
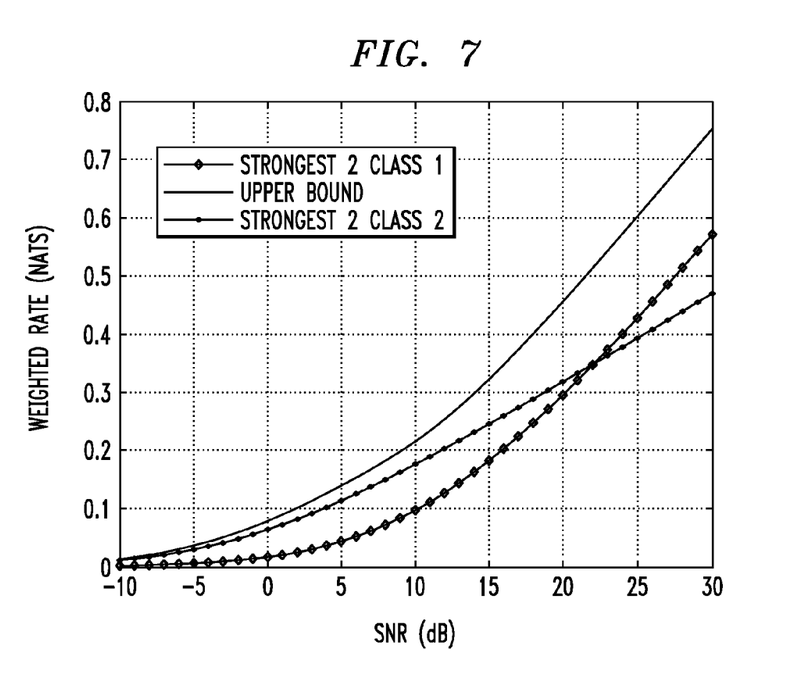
Figure 8:
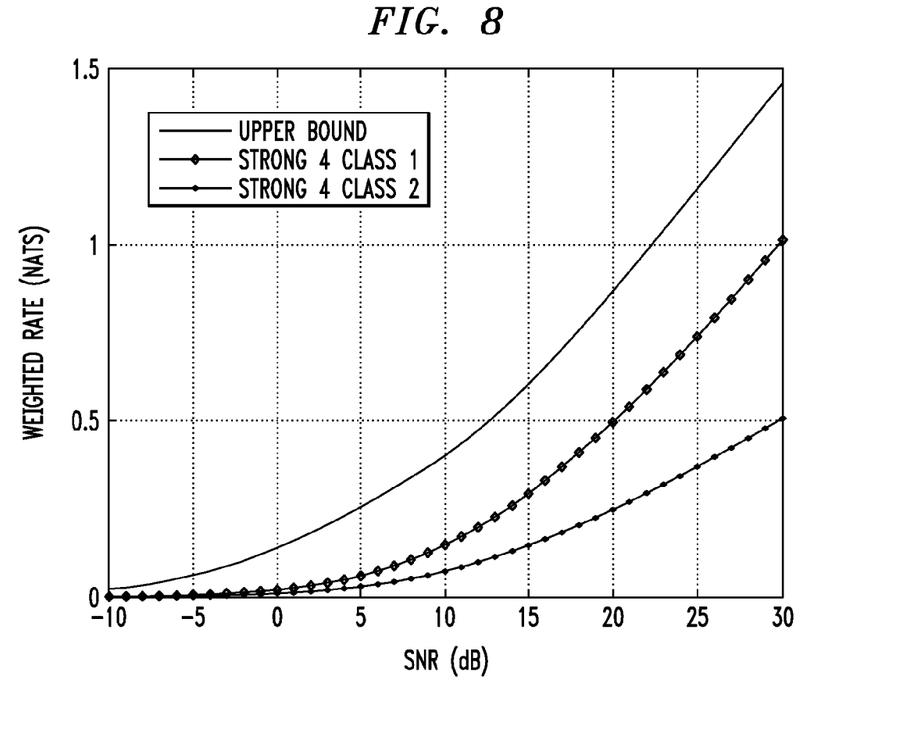
Figure 9:
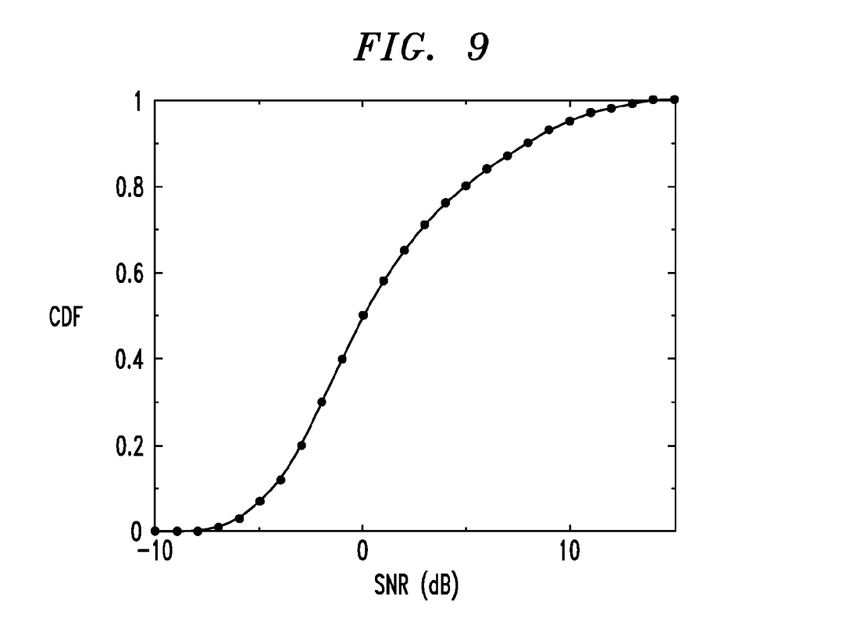
FIG. 9 is a plot of a cumulative distribution function (CDF) of SNR values.

In a first set of simulations, the results of which are shown in FIGS. 6 through 8, we consider a scenario with two classes of users, and examine the problem of maximizing the weighted sum rate. In particular, we investigate the accuracy of the asymptotic estimate described above for the rate penalty incurred by scheduling the class-1 users with the M largest norms without taking any phase information into account.

Figure 10:
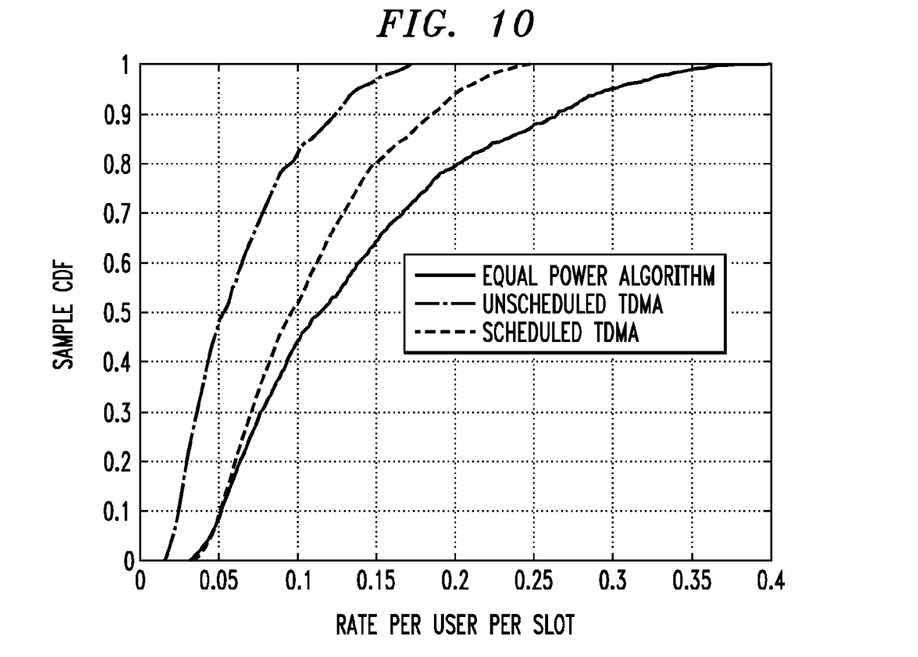
FIGS. 10 and 11 are plots of sample CDFs of user throughputs in illustrative embodiments of the invention.
Figure 11:
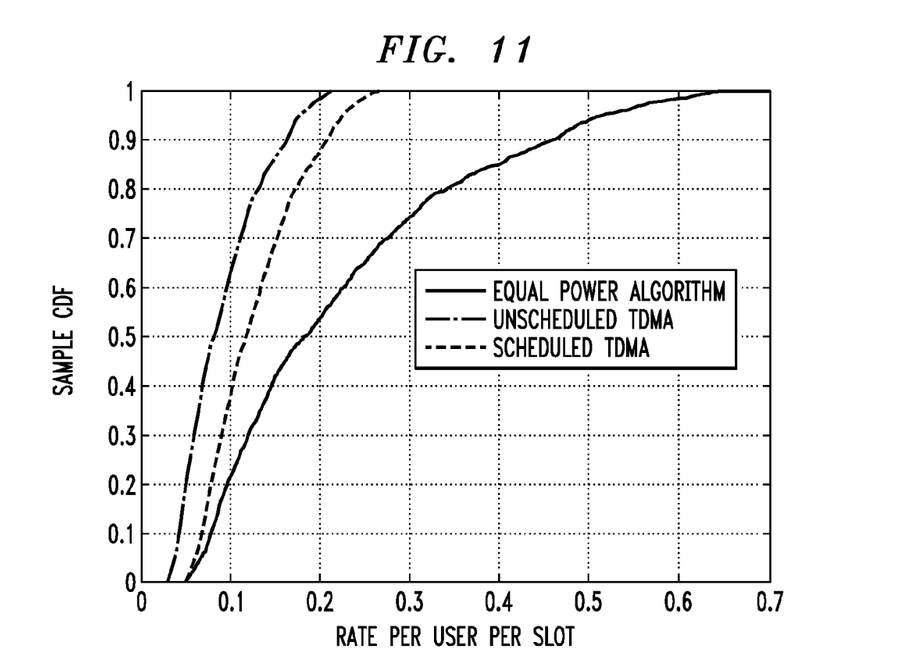

In a second set of simulations, the results of which are shown in FIGS. 10 and 11, we consider a scenario with entirely heterogeneous user characteristics, and address the problem of maximizing the aggregate logarithmic utilities of the average rate, in this case a Proportional Fair (PF) rate allocation. We compare the performance of one illustrative embodiment of the invention, namely a scheme which transmits to M users based on their weights and channel magnitudes, with a hypothetical scheme which can select any rate vector that satisfies the upper bound in (5).

The numerical simulations assume that the components of the channel vectors of the various users are independent and distributed according to N(0,1), which corresponds to Rayleigh fading. It is further assumed that the channel vectors are independent from slot to slot. Again, these and other assumptions made herein should not be construed as requirements or limitations of the invention.

Referring now to the first set of simulations, we more particularly consider a two-class scenario with $K_1=10$ class-1 users, $K_2=10$ class-2 users and weight factors $(w_1, w_2)=(2,1)/30$. For compactness, define $\gamma=\beta_2^2/\beta_1^2$. As indicated above, the asymptotic rate gap is $$M\begin{bmatrix} V(w_c;\beta_c;1)- \\ 2w_1\log(\beta_1) \end{bmatrix} + = [M[\log(P_1^*\beta_1^2)+\log(P_1^*\beta_1^2+P_2^*\beta_2^2)-$$
$$(M-1)w_1$$
$$4\log(\beta_1)]+2(M-1)]/30$$
$$= [M[\log(P_1^*)+\log(P_1^*+P_2^*\gamma)]+$$
$$2(M-1)]/3$$

with $$P_1^* = \frac{\gamma}{2(\gamma-1)}$$

and $P_2^*=1-P_1^*$, provided $\beta_1^2 \leq \beta_2^2/2$. Thus, the asymptotic rate gap may be expressed as $$\left[M\begin{bmatrix} \log(P_1^*)+ \\ \log(P_1^*+\gamma P_2^*) \\ 2(M-1) \end{bmatrix}\right]/30 = \left[M\begin{bmatrix} 2\log(\gamma)-2\log(2)- \\ \log(\gamma-1) \\ 2(M-1) \end{bmatrix}+\right]/30.$$

FIG. 6 shows the expected weighted sum rate in a system with M=2 antennas with the above-noted user population $(K_1,K_2)=(10,10)$ and weight factors $(w_1,w_2)=(2,1)/30$, and channel coefficients $(\beta_1,\beta_2)=(1/2,1)$. The figure plots the upper bound, and further shows simulation results for three selection schemes, namely, a bound scheme, a scheme which selects the strongest two class-1 users based on norms alone, and a scheme which selects the strongest two class-2 users based on norms alone. The bound scheme is one that selects users and allocates power based on optimization of an upper bound. In this system, $\gamma=\beta_2^2/\beta_1^2=4$, and the approximate asymptotic rate gap is

[2[2 log(2)–log(3)]+2]/30≈0.08585.

This approximate asymptotic rate gap is close to the rate gap of 0.11 at SNR=30 dB as observed in FIG. 6. It should be noted that the rates in this figure and FIGS. 7 and 8 are in natural units, or Nats, which are based on natural logarithms.

FIG. 7 shows the upper bound and the simulation results for the schemes which select the strongest two class-1 or class-2 users, with the channel coefficients now being given by $(\beta_1,\beta_2)=(1/4,1)$, but with the number of antennas, user populations and weight factors remaining the same as in the FIG. 6 case. Thus, $\gamma=16$, and the approximate asymptotic rate gap is

[2[2 log(8)–log(15)]+2]/30≈0.1634.

This approximate asymptotic rate gap is close to the rate gap of 0.18 at SNR=30 dB as observed in FIG. 7.

FIG. 8 shows the upper bound and the simulation results for the schemes which select the strongest two class-1 or class-2 users, with the number of antennas now being given by M=4, but with the user populations, weight factors and channel coefficients remaining the same as in the FIG. 7 case. Again, $\gamma=16$, and the approximate asymptotic rate gap is

[4[2 log(8)–log(15)]+6]1/30≈0.3934.

This approximate asymptotic rate gap is close to the rate gap of 0.46 at SNR=30 dB as observed in FIG. 8.

Turning now to the above-noted second set of simulations, these simulations assume a system which operates using time slots, and we make the usual block fading assumption that the slot length is short enough for the channels of the various users to remain constant or nearly constant, yet sufficiently long to achieve a transmission rate close to the theoretical capacity. Thus, the model considered so far may be interpreted as a snapshot of the system in time, with the randomness in the channel vectors representing temporal variations due to multi-path propagation effects. In particular, the set of feasible rate vectors in each time slot is determined by the previously-described capacity region associated with the instantaneous channel vectors in that time slot.

Let $h_1(t), \ldots, h_K(t)$ be the channel vectors of the various users in time slot t, and let $C_{BC}(t)=C_{BC}(h_1(t),\ldots,h_K(t);P)$ be the associated capacity region. Let $A_{BC}$ be the set of achievable long-term throughput vectors, and let $S^{PF}:=(S_1^{PF},\ldots,S_K^{PF})$ be the Proportional Fair throughput allocation, i.e., $\Sigma_{k=1}^K \log(S_k^{PF})=\max_{S \in A_{BC}} \Sigma_{k=1}^K \log(S_k)$. Let $S_k(t)$ be the geometrically smoothed throughput of user k in time slot t, which is updated according to the recursion $$S_k(t+1)=(1-\delta)S_k(t)+\delta R_k(t),$$

with $R_k(t)$ the rate received by user k in time slot t and $\delta \in (0,1)$ a smoothing parameter. Thus $1/\delta$ may be interpreted as the time constant in the geometric smoothing. A typical value is $\delta=0.001$.

Now suppose we have a scheduling strategy which selects in time slot t a rate vector identified by arg $\max_{R \in C_{BC}(t)} \Sigma_{k-1}^K w_k(t) R_k(t)$, with $w_k(t):=1/S_k(t)$. The geometrically smoothed throughput vector $S(t):=(S_1(t), \ldots, S_K(t))$ converges to the Proportional Fair vector $S^{PF}$ as $\delta \downarrow 0$. Unfortunately, however, determining the rate vector $\max_{R \in C_{BC}(t)} \Sigma_{k=1}^K w_k(t) R_k(t)$ is quite demanding, both computationally and in terms of feedback overhead.

As noted above, the illustrative embodiment characterized in the second set of simulations transmits to M users based on their weights and channel magnitudes. This embodiment solves the rate vector determination problem in an approximate fashion. Specifically, we first calculate an approximate rate $$\hat{R}_k(t) := \log\left(1 + \frac{P}{M} \|h_k(t)\|^2\right)$$

for each user k, which represents the rate that the user would receive if it were allocated a fraction 1/M of the total available power in the absence of any interference. Next, we compute the value $w_k(t)\hat{R}_k(t)$ for each user k and select the group of users with the M largest values. This is one example of the manner in which a subset of users may be identified in step 302 of the FIG. 3 process.

Once these users have been selected, there are several options for allocation of the transmission power among the selected users, as was previously noted in conjunction with the description of FIG. 3. For example, it is possible to simply allocate power P/M to each of the M users, which avoids the need for steps 304 and 306 of the FIG. 3 process. This approach, identified as the equal power algorithm in FIGS. 10 and 11, was used in the second set of simulations.

Numerous other approaches may be used for allocating the transmission power among the selected users. One such approach is to allocate power based on optimization of the upper bound in Equation (5). This optimization may be performed, by way of example, using the algorithm described in A. Gupta and S. Toumpis, "Power allocation over parallel Gaussian multiple access and broadcast channels," IEEE Trans. Inf. Theory, Vol. 52, pp. 3274-3282, 2006. Another possible approach is to allocate power based on optimization of the actual weighted sum rate in Equation (1). This optimization may be performed using the algorithm described in H. Viswanathan et al., "Downlink capacity evaluation of cellular networks with known interference cancellation," IEEE J. Sel. Areas Commun., Vol. 21, No. 5, pp. 802-811.

The other approaches may make use of channel vector phase information, obtained, for example, in the manner indicated in steps 302 and 304 of the FIG. 3 process. It should be noted that allocation of transmission power is one example of utilization of channel vector phase information to control transmission to users. Other embodiments may additionally or alternatively control other transmission parameters based on the channel vector phase information.

As indicated previously, the second set of simulations utilize equal allocation of power to each of the selected users. Once the power levels have been determined, the actual rates are derived as $R_k(t)=S_k(t)-S_{k-1}(t)$, with $S_1(t), \ldots, S_K(t)$ the partial sum rates as given by $$S_k(t) = \log \det\left(I_M + \sum_{k=1}^K P_k(t) h_k^\dagger(t) h_k(t)\right).$$

In order to benchmark the performance of the above-described equal power scheme, we further examine a hypothetical scheme which selects the rate vector in time slot t identified as $\arg_{max_{R \in U}^{w(t)}} \Sigma_{k=1}^K w_k(t) R_k(t)$, with $w_k(t):=1/S_k(t)$ as before and $U^w$ the outerbound for the capacity region $C_{BC}(t)$ based on the inequality in Equation (5). Since the region $U^w$ provides an upper bound for the region $C_{BC}$ for any vector w, the associated set of achievable long-term throughput vectors $\hat{A}_{BC}$ also includes the actual achievable throughput region $A_{BC}$. Therefore the Proportional Fair allocation $\hat{S}^{PF}$ must dominate the Proportional Fair allocation $S^{PF}$ componentwise. The geometrically smoothed throughput vector for the above-described hypothetical scheme converges to the vector $\hat{S}^{PF}$.

In addition, we compare the performance of the equal power scheme with two single-user schemes, namely a scheduled TDMA scheme which allocates the total available power to the user with the largest value of $w_k(t)\log(1+P\|h_k(t)\|^2)$ and an unscheduled TDMA scheme which allocates the full power to one of the users at random.

The long-term throughput vector for the equal power scheme may be characterized as follows. For a given weight vector w, let $R_w$ be a random vector representing the rates received by the various users. Then the long-term throughput vector maybe characterized as the solution to a fixed-point equation:

$$S = E[R_w],$$

with $w_k=1/S_k$, $k=1, \ldots, K$. The distribution of the random vector $R_w$ is hard to determine in general. However, if $R_w$ is determined as the solution to an optimization problem, then $$R_w = \arg \max_{R \in U^w} \sum_{k=1}^K w_k R_k.$$

For the equal power scheme, there is no tractable description of the random vector $R_w$, making it hard to determine the long-term throughput vector S, and thus to compare the performance with the upper bound $\hat{S}^{PF}$.

We will use numerical means to study the performance of the equal power scheme and compare it with the upper bound and the two single-user schemes. Throughout we consider a system with K=20 users. We performed 100 runs, each consisting of 50,000 time slots, with the value of the smoothing parameter set to $\delta=0.001$. For each of the runs, the time-average SNR values of the various users were independently sampled from the distribution graphed in FIG. 9, which shows the CDF of time-average SNR values. We considered two scenarios with M=2 and M=4 transmit antennas, respectively.

TABLE 1 shows the mean rate per user per time slot for the equal power scheme, the scheduled TDMA scheme, and the upper bound which assumes the users to be orthogonal. These results indicate that the equal power scheme is within 20% of the optimal value in terms of average user throughput given that M users are selected.

TABLE 1

Results of PF Scheduling Simulations

| Simulation | Equal Power | Scheduled TDMA | Upper bound |
|---|---|---|---|
| M = 2 | 0.1362 | 0.1071 | 0.1528 |
| M = 4 | 0.2244 | 0.1265 | 0.2616 |

FIGS. 10 and 11 provide additional insight into how the throughput gains vary among users with different time-average SNR values.

FIG. 10 displays the sample CDFs for scheduled and unscheduled TDMA as well as the equal power scheme for the case of M=2 transmit antennas. As the results demonstrate, multi-user MIMO provides a systematic gain in user throughputs which steadily increases as the underlying time-average SNR values increase. Since multi-user MIMO offers little improvement over TDMA at low SNR values, this indirectly indicates that the PF algorithm lets the low-SNR users share in the benefits enjoyed by the high-SNR users by scheduling them in a larger fraction of the time slots.

FIG. 11 plots the corresponding results for the case of M=4 transmit antennas. The results are qualitatively similar as before, with the exception that the gain in user throughputs as the underlying time-average SNR values increase is much greater. For example, the improvement over scheduled TDMA is now by a factor well in excess of two and over unscheduled TDMA by a factor of over three.

The numerical simulations described above indicate that the corresponding illustrative embodiments perform well, even for a moderate number of users.

Advantageously, the scheduling approach of the illustrative embodiments can significantly reduce the overhead burden associated with scheduling users based on forward channel state information in a multi-user MIMO system. Near-optimal performance can be achieved using minimal forward channel state information.

It should again be emphasized that the embodiments described above are presented by way of illustrative example only. Other embodiments may use different system configurations, scheduling algorithms, scheduling intervals, slot structures, processing operations, etc. depending on the needs of the particular communication application.

For example, although the illustrative embodiments utilize measures of weighted sum capacity and weighted sum rate, other types of measures may be used in optimizing throughput in other embodiments.

As another example, other types of scheduling algorithms may be used in alternative embodiments. The above-noted PF scheduling algorithm is an example of a gradient-based strategy, where user weights are set to derivatives of user utility functions. In the PF implementation described above, the user utility function is a logarithmic utility function, although other types of utility functions or gradient-based strategies maybe used. In queue-based scheduling algorithms, the user weights are typically taken to be functions of the respective queue lengths.

As yet another example, the present invention does not require any particular channel vector configuration. Thus, the term "channel vector" as used herein is intended to be construed broadly, so as to encompass a variety of different arrangements of information which characterize a channel between a base station and a wireless terminal.

Various embodiments of the present invention may make use of time slotted transmission of the type described in U.S. patent application Ser. No. 11/553,191, filed Oct. 26, 2006 and entitled "MIMO Communication System with Variable Slot Structure," which is commonly assigned herewith and incorporated by reference herein.

The particular MIMO system configuration shown in FIGS. 1 and 2 and the scheduling process shown in FIG. 3 may be altered in other embodiments. Also, the particular techniques for identifying a subset of users, obtaining channel vector magnitude and phase information, allocating transmission power among the users in the subset, etc. in the scheduling process of FIG. 3 may be altered to accommodate particular applications. These and numerous other alternative embodiments within the scope of the appended claims will be readily apparent to those skilled in the art.

What is claimed is:

1. A method of communicating information in a multiple-input, multiple-output communication system in which a base station communicates with multiple terminals, the method comprising the steps of:
    obtaining channel vector magnitudes for respective ones of the terminals;
    based on the channel vector magnitudes, identifying a subset of the terminals;
    obtaining channel vector phase information for the identified subset of terminals but not for those of the terminals that are outside of the identified subset; and
    utilizing the channel vector phase information to control transmission to the identified subset of terminals.

2. The method of claim 1 wherein the base station communicates with the multiple terminals via M antennas, and the identified subset of the terminals comprises a number of terminals greater than or equal to M.

3. The method of claim 2 wherein the identified subset of the terminals comprises a number of terminals equal to M.

4. The method of claim 1 wherein the utilizing step comprises allocating available transmission power among the identified subset of terminals.

5. The method of claim 4 wherein the available transmission power is divided evenly among the identified subset of terminals.

6. The method of claim 4 wherein the available transmission power is divided among the identified subset of terminals based on optimization of an upper bound of a weighted sum rate.

7. The method of claim 4 wherein the available transmission power is divided among the identified subset of terminals based on optimization of an actual weighted sum rate.

8. The method of claim 4 wherein the available transmission power is divided among the identified subset of terminals based on the channel vector phase information.

9. The method of claim 1 wherein the terminals in the identified subset are served by the base station in a designated scheduling interval.

10. A method of communicating information in a multiple-input, multiple-output communication system in which a base station communicates with multiple terminals, the method comprising the steps of:
    obtaining channel vector magnitudes for respective ones of the terminals;
    based on the channel vector magnitudes, identifying a subset of the terminals;
    obtaining channel vector phase information for the identified subset of terminals; and
    utilizing the channel vector phase information to control transmission to the identified subset of terminals;
    wherein the subset of terminals is identified by determining approximate rates for respective ones of the terminals for which channel vector magnitudes are obtained, computing corresponding weighted approximate rates, and selecting the subset of terminals based on the weighted approximate rates.

11. The method of claim 10 wherein the approximate rate for a k-th one of the terminals for which channel vector magnitudes are obtained is given by:

$$\hat{R}_k(t) := \log\left(1 + \frac{P}{M}\|h_k(t)\|^2\right),$$

where t denotes a particular scheduling interval, M denotes number of base station transmission antennas, P denotes an available transmission power, and $\|h_k(t)\|$ denotes the channel vector magnitude obtained for the k-th terminal.

12. The method of claim 11 wherein the weighted approximate rate for the k-th terminal is given by $w_k(t)\hat{R}_k(t)$, where $w_k(t)$ denotes a weight associated with the k-th terminal in scheduling interval t.

13. The method of claim 10 wherein the step of selecting the subset of terminals based on the weighted approximate rates comprises selecting the terminals with the M largest weighted approximate rates, where M denotes number of base station transmission antennas.

14. An article of manufacture comprising a processor-readable storage medium storing one or more software programs which when executed by a processor perform the steps of the method of claim 1.

15. A base station of a multiple-input, multiple-output communication system, the base station being configured to communicate with multiple terminals of the system, the base station comprising:

an antenna array comprising a plurality of antennas for communicating with the multiple terminals; and transceiver circuitry coupled to the antennas of the antenna array;

wherein the base station is operative to obtain channel vector magnitudes for respective ones of the terminals, to identify a subset of the terminals based on the channel vector magnitudes, to obtain channel vector phase information for the identified subset of terminals but not for those of the terminals that are outside of the identified subset, and to utilize the channel vector phase information to control transmission to the identified subset of terminals.

16. The base station of claim 15 further comprising:

a processor coupled to the transceiver circuitry;

wherein said processor is configured to obtain the channel vector magnitudes, to identify the subset, to obtain the channel vector phase information, and to utilize the channel vector phase information to control transmission.

17. A base station of a multiple-input, multiple-output communication system, the base station being configured to communicate with multiple terminals of the system, the base station comprising:

an antenna array comprising a plurality of antennas for communicating with the multiple terminals; and transceiver circuitry coupled to the antennas of the antenna array;

wherein the base station is operative to obtain channel vector magnitudes for respective ones of the terminals, to identify a subset of the terminals based on the channel vector magnitudes, to obtain channel vector phase information for the identified subset of terminals, and to utilize the channel vector phase information to control transmission to the identified subset of terminals; and wherein the base station identifies the subset of terminals by determining approximate rates for respective ones of the terminals for which channel vector magnitudes are obtained, computing corresponding weighted approximate rates, and selecting the subset of terminals based on the weighted approximate rates.

18. The base station of claim 17 wherein the approximate rate for a k-th one of the terminals for which channel vector magnitudes are obtained is given by:

$$\hat{R}_k(t) := \log\left(1 + \frac{P}{M}\|h_k(t)\|^2\right),$$

where t denotes a particular scheduling interval, M denotes number of base station transmission antennas, P denotes an available transmission power, and $\|h_k(t)H\|$ denotes the channel vector magnitude obtained for the k-th terminal.

19. The base station of claim 17 wherein the subset of terminals is selected based on the weighted approximate rates by selecting the terminals with the M largest weighted approximate rates, where M denotes number of base station transmission antennas.

20. A multiple-input, multiple-output communication system comprising:

a plurality of terminals; and at least one base station configured to communicate with the terminals;

wherein the base station is operative to obtain channel vector magnitudes for respective ones of the terminals, to identify a subset of the terminals based on the channel vector magnitudes, to obtain channel vector phase information for the identified subset of terminals but not for those of the terminals that are outside of the identified subset, and to utilize the channel vector phase information to control transmission to the identified subset of terminals.

* * * * *

UNITED STATES PATENT AND TRADEMARK OFFICE
CERTIFICATE OF CORRECTION

PATENT NO. : 7,801,238 B2
APPLICATION NO. : 11/694443
DATED : September 21, 2010
INVENTOR(S) : Simon C. Borst et al.

It is certified that error appears in the above-identified patent and that said Letters Patent is hereby corrected as shown below:

Claim 18, col. 20, line 32, please delete

" $\|h_k(t)H\|$ "

and insert

-- $\|h_k(t)\|$ --

Signed and Sealed this

Twenty-first Day of December, 2010

David J. Kappos
*Director of the United States Patent and Trademark Office*